United States Patent Office 3,367,514
Patented Feb. 6, 1968

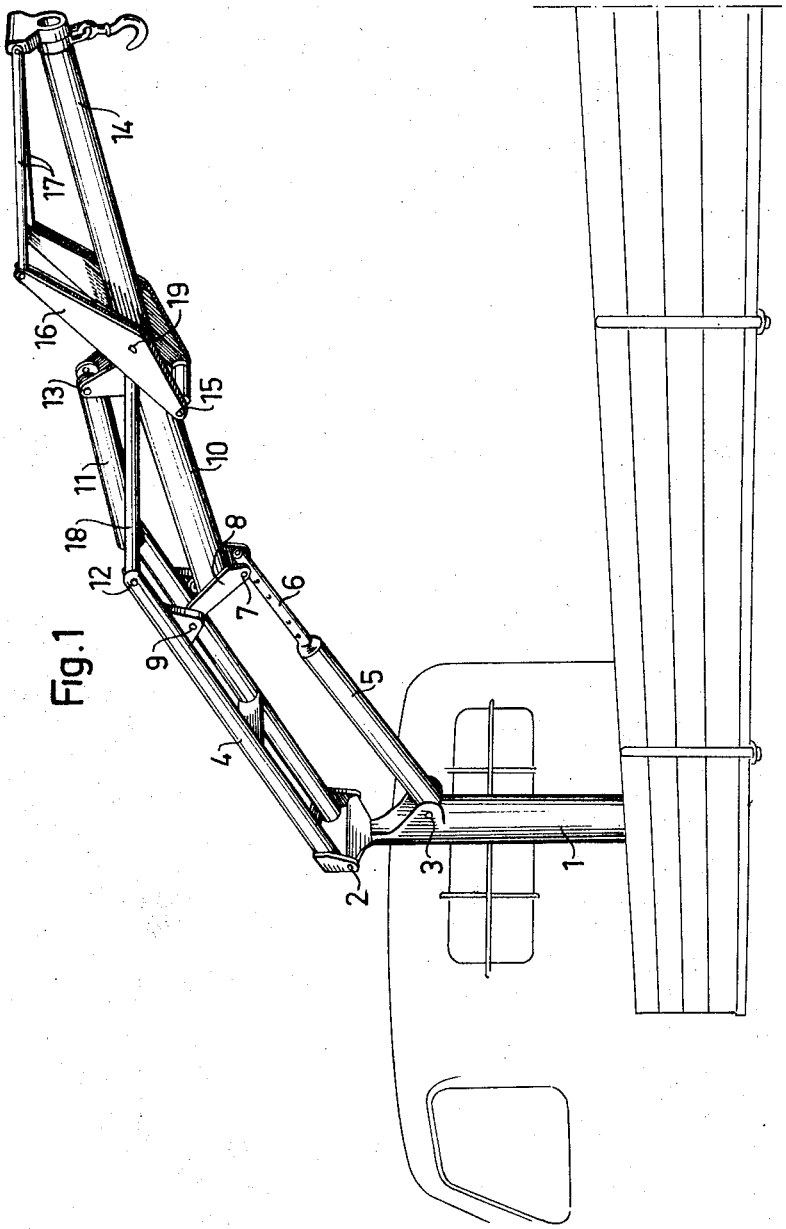

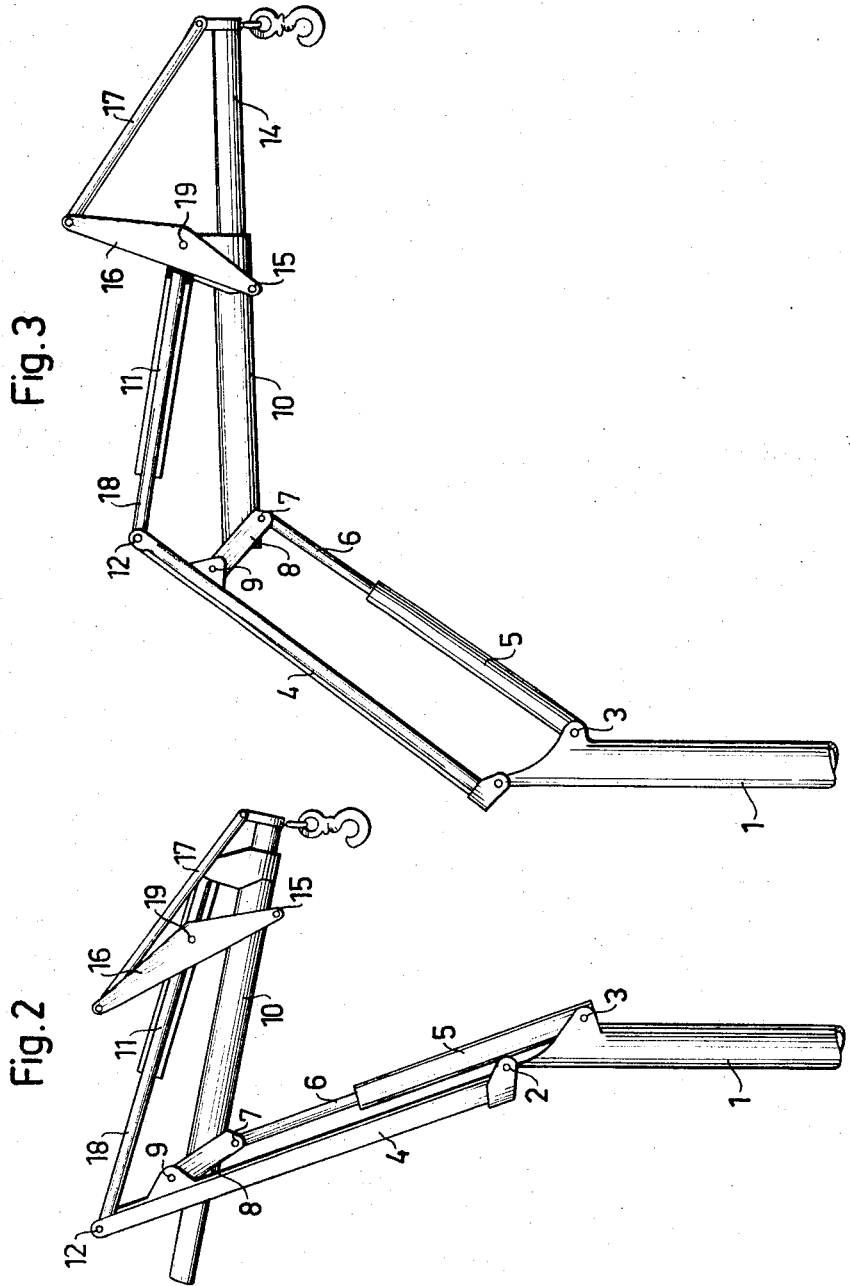

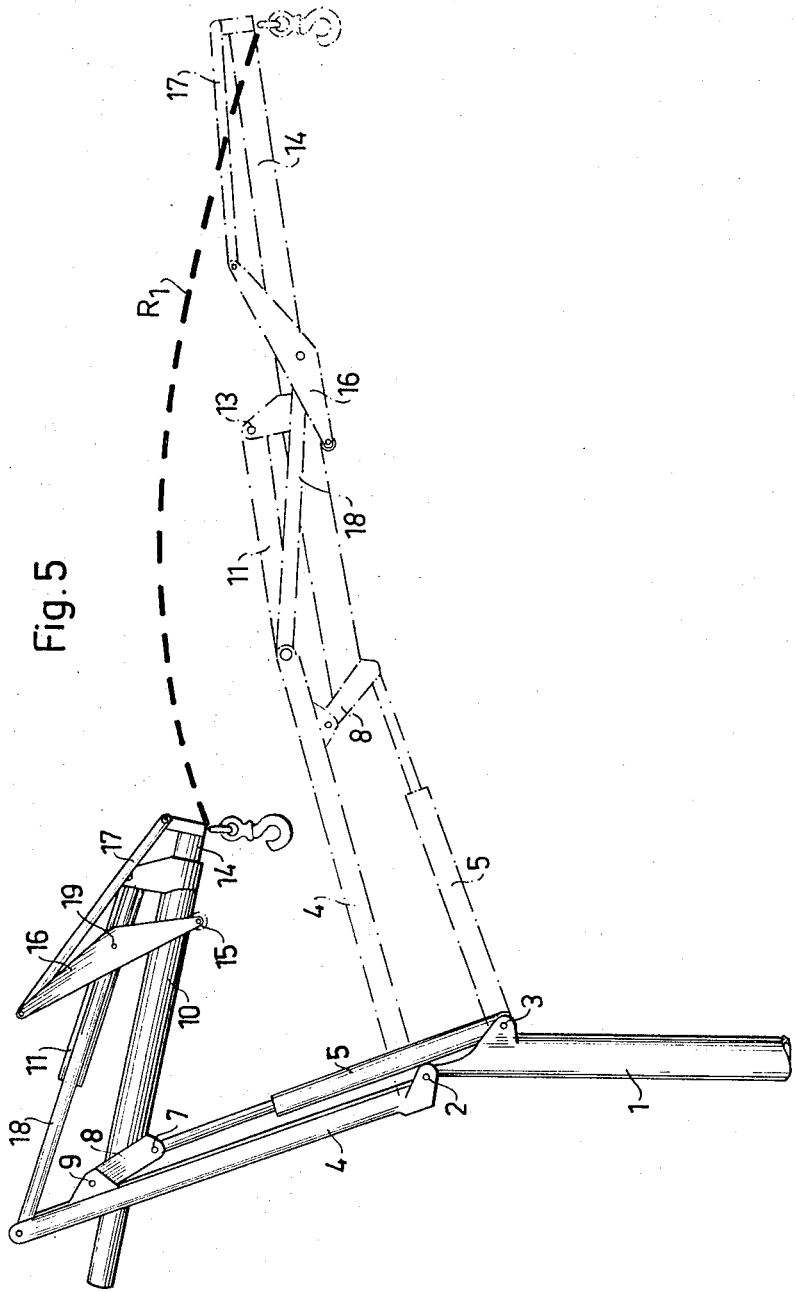

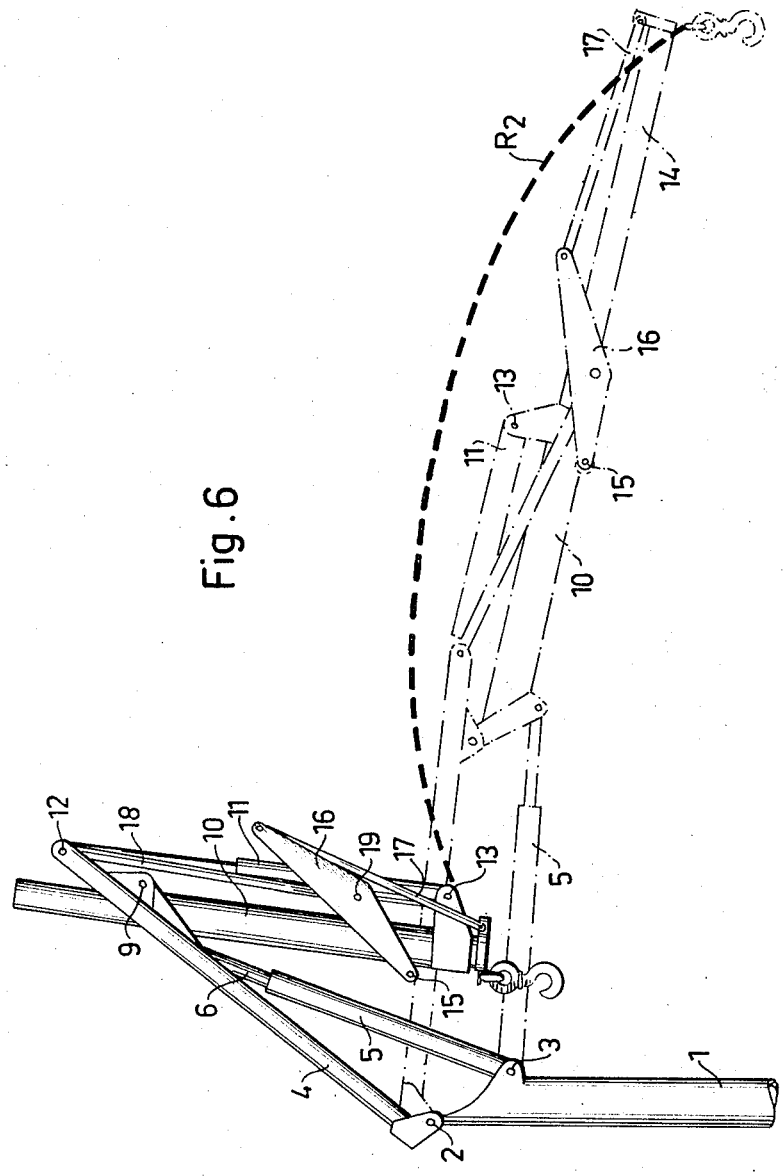

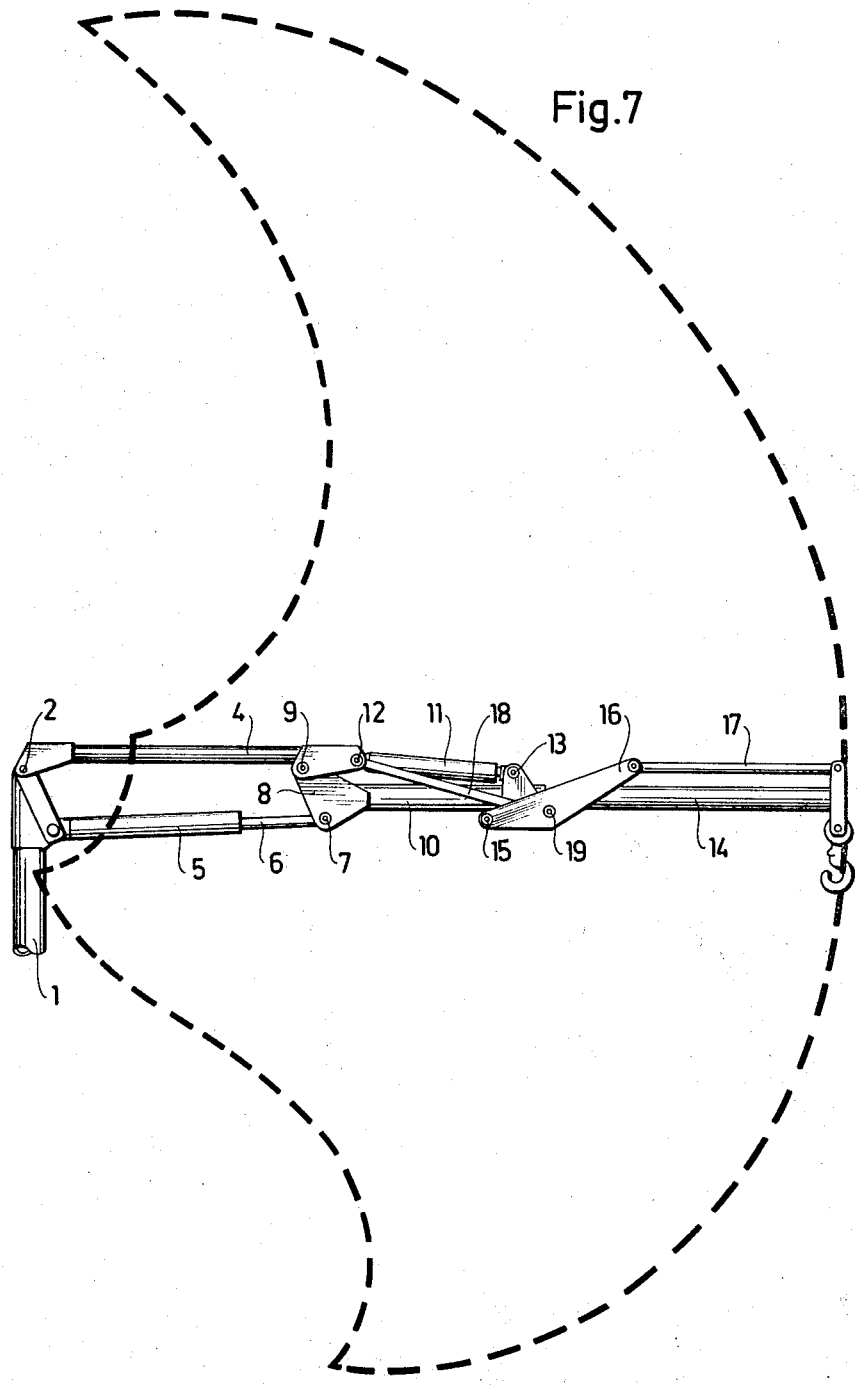

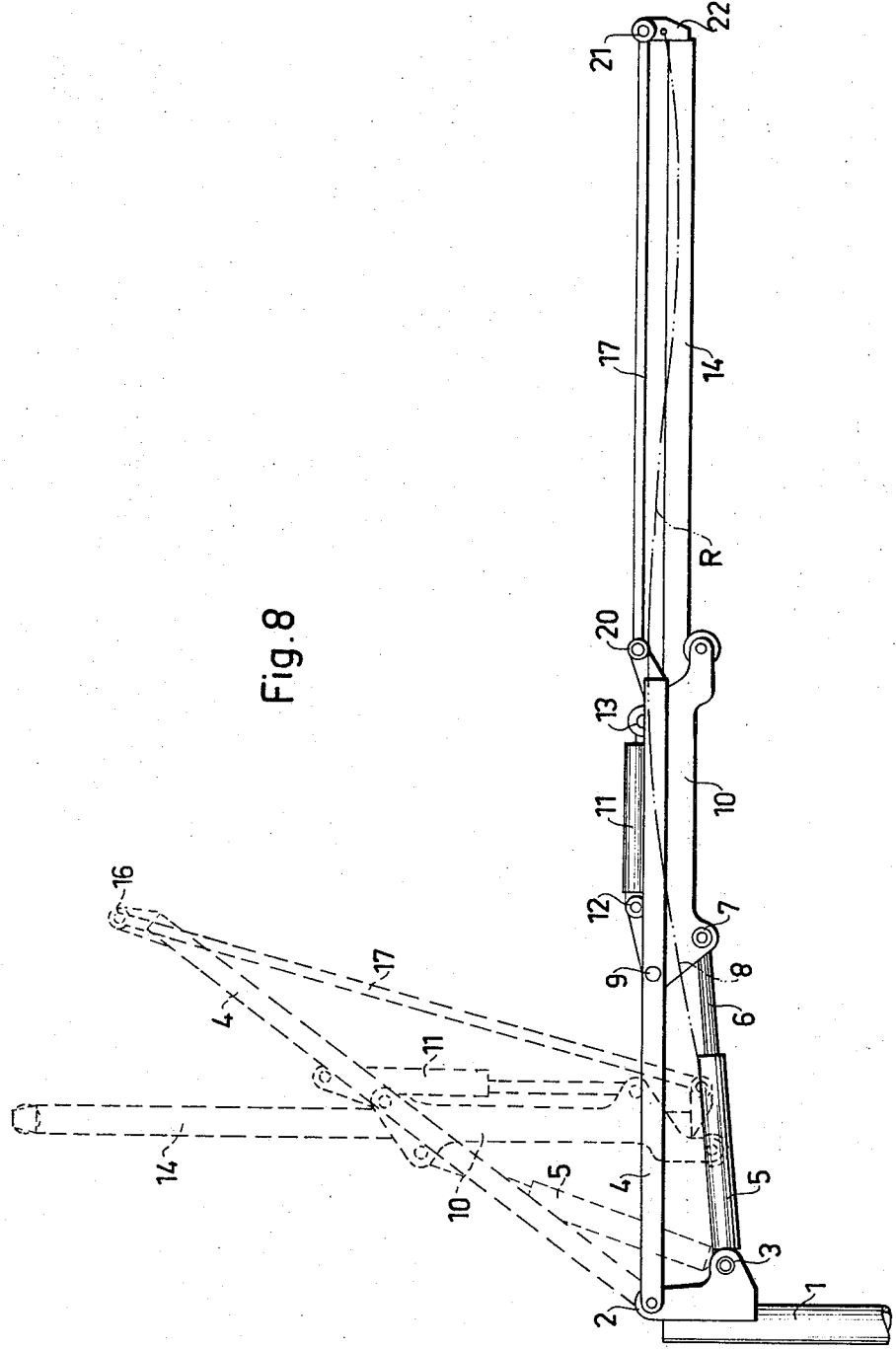

3,367,514
LOADING APPARATUS FOR VEHICLES
Karl Georg Erlund Marklund, Torsgatan 19 I, and Dick Lennart Rehnstrom, Varvsgatan 2, both of Skelleftea, Sweden
Filed July 28, 1966, Ser. No. 568,644
Claims priority, application Sweden, Aug. 6, 1965, 10,333/65; Apr. 4, 1966, 4,496/66
5 Claims. (Cl. 212—35)

ABSTRACT OF THE DISCLOSURE

The present invention relates to loading apparatus, and more particularly to a pressure fluid operated truck crane having a jib or boom pivotally mounted on the top end of a post to be swingable in a vertical plane by being actuated by a pressure fluid cylinder device having one end thereof pivotally connected to said post, its opposite end being pivotally connected to a link disposed adjacent to the end of said jib or boom remote from the post, said link cooperating with a telescopically extensible rocker arm movable in a vertical plane by means of a second pressure fluid cylinder device.

---

Figure 4:
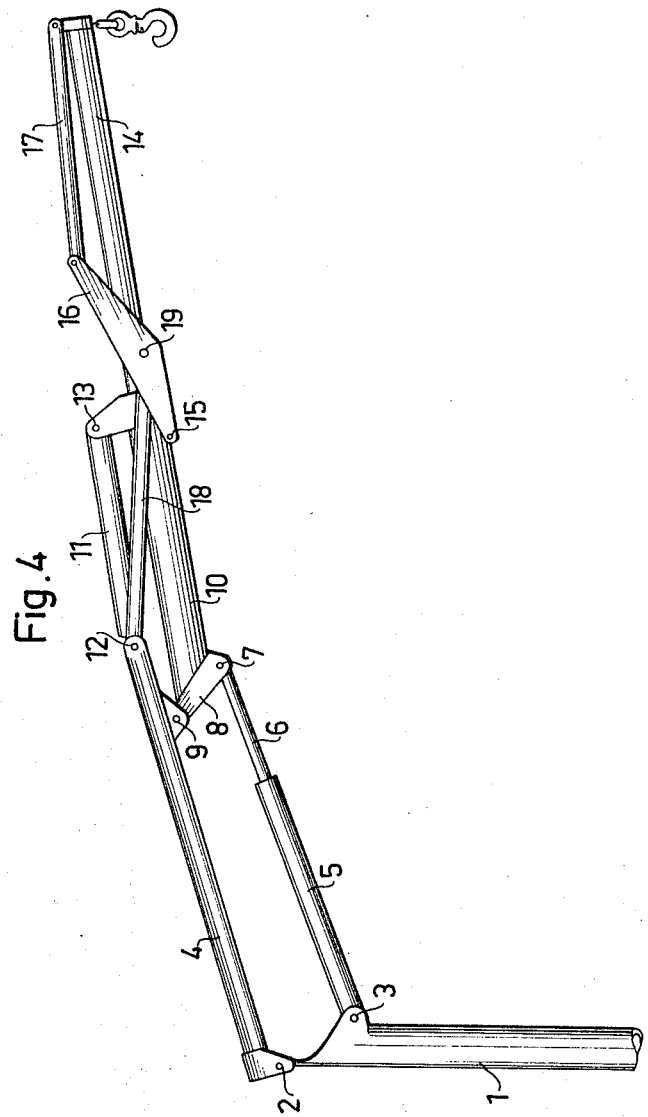

The field of application of truck cranes, in late years, has changed essentially. Previously, such a crane was merely a facility enabling the truck operator to load his vehicle with heavy loads. Today, however, such cranes are being utilized for pure production loading purposes. Such development has brought with it that the old crane constructions are no longer satisfying the requirements which must be put on them in order that they shall function rationally when used for these last-mentioned purposes. Among such limitations applying to the types of truck cranes previously used, it may be mentioned, for example, that it has been found necessary to equip them with a comparatively large number of hydraulic control valves in order to establish the desired pattern of movements. Since the crane operator, of course, can actuate no more than two controls at a time, it follows that, in principle, the pattern of movements attainable has been a combination of several partial movements in the planes of motion concerned. Typically, one case frequently occurring in practice resides in that a load disposed on the ground beside the vehicle is to be lifted up and deposited onto the truck platform. Thus, the resulting movement will be composed of a movement in the vertical sense, that is, from the ground surface to the required level above the platform, further a horizontal movement to swing the load inwardly above the platform, then a translatory horizontal movement for moving the load to a point above the place on the platform where it is desired to be disposed, and, finally, a further vertical movement, that is a lowering of the load into this place. These structural and functional conditions involve that, while being transferred from its starting point to its terminal point, the load will have to follow a path which is substantially longer than the ideal one, which, in its turn, means that the time required for carrying out a loading operation will be correspondingly extended. Thus, when utilizing the crane for loading a large number of units—this being frequently the case in downright production loading work—all these increases in loading times will cumulate correspondingly, which involves a considerable handicap from the points of view of productivity and rationalization.

The present invention is based on the concept that it is possible to construct a truck crane in a manner enabling the number of hydraulic systems and associated controls to be reduced, and, in addition, enabling the path of movement of the load to become much shorter than previously and to approach, more or less, a straight line. The main characterizing features of loading apparatus according to the invention reside in that the above-mentioned link between the jib or boom and its fluid cylinder device is rigidly connected to the inner end of the rocker arm, and in that the rocker arm fluid cylinder device is pivotally connected between the outer end of the jib or boom and the outer end of the innermost telescoping member of the rocker arm, and in that a connecting rod has one end thereof pivotally connected to one of the outer telescoping members of the rocker arm, its opposed end being connected to the jib or boom.

Two embodiments of the invention will be described more in detail hereinafter, reference being had to the accompanying diagrammatic drawing. Identical or corresponding elements shown in the various figures are provided with identical reference numerals.

FIG. 1 is a side-elevational view of a loader constructed according to the first embodiment of the invention and mounted on a truck;

FIGS. 2, 3 and 4 each show the loader of FIG. 1 in side elevation and in different positions of operation, respectively;

FIG. 5 shows the loader in the same position as FIG. 2, the position corresponding to FIG. 4 being also shown in dot-and-dash lines, and the path of movement of the extreme end point of the jib or boom is indicated, as well;

FIG. 6, in a manner similar to FIG. 5, shows the crane jib or boom in two different positions, the path of movement of the extreme end of the jib or boom being also indicated;

FIG. 7, on a smaller scale, shows the loader with its crane jib or boom in a horizontal position, and also showing an operating diagram the contour line of which indicates the entire range of operation within which the actual implement of the crane can be moved; and FIG. 8 is a side-elevational view of a loader according to the second embodiment of the invention, the full lines showing the crane jib or boom in its fully extended position, while the broken lines illustrate a retracted and folded position thereof.

Referring to the drawings, numeral 1 designates a tubular post constituting the carrier stand of the crane and having at its top end two pivot axes, viz. an upper axis 2 and a lower one 3. Pivoting about the axis 2 is the inner end of the crane jib 4 which, in the embodiment shown, comprises two spaced parallel members. The lifting movement is effected by means of a lifting cylinder device 5 having a piston rod 6. The extreme end of the latter, at 7, is pivotally connected to one end of a link 8 having its opposite end pivoted, at 9, to the jib 4. Link 8 has rigidly secured to it a rocker arm 10 operable by a fluid cylinder device 11. The latter is pivotally linked in between the axes 12 and 13, the former being disposed at the extreme end of the main arm or jib 4, and the latter being disposed at the extreme end of the rocker arm 10 proper. The latter, as shown, has a telescoping extension member 14 having a load hook secured to its extreme end. In practice, of course, this load hook or its equivalent would instead be fitted to the end of a separately operated wire tackle, although, for better perspicuity, the same has been illustrated here in the manner just indicated.

Pivotally mounted adjacent the extreme end of the rocker arm 10, at 15, is one end of a yoke 16, also composed of duplicated spaced parallel members. Disposed between the opposite end of each such member and the extreme end of the telescoping extension 14 is a connecting rod 17. In the corresponding fashion two pull rods 18 are provided, these rods being mounted between pivot axis 12 and a pivot axis 19 disposed approximately centrally between the ends of the yoke.

From the foregoing description and from the various figures of the drawings, the function of the loader will also be apparent. It is seen also (FIG. 7) that the crane is capable of covering a very large range and that any operation of the actuating cylinder for the rocker arm 10 will positively move the yoke 16, such movement, in its turn, resulting in a displacement of the telescoping member 14. Thus by this means, one control system has been saved.

It has been found in practice that the extreme elaborate collapsing capacity characterizing the crane in the embodiment of the invention illustrated in FIGS. 1 to 7, is not always required. Many users of truck cranes are willing to abstain from this facility, only the great flexibility and large range of the loader be retained, provided the limitation as regards collapsability would enable the loader to be acquired at a lower price. Such simplified construction can be realized by omitting two elements forming part of the crane, viz. the yoke 16 and pull rod 18. In order to prevent such intervention from causing excessive reduction of the flexibility of the crane, however, the construction should be modified, additionally, in two respects. These modifications reside in that the pivot axis between the actuating cylinder of the rocker arm and the jib or boom is disposed at a substantial distance inwardly of the extreme end of the jib or boom, and in that the last-mentioned jib end is connected directly to the connecting rod 17.

FIG. 8 illustrates a crane modified as described in the next-preceding paragraph. Numerals 1 to 14 and 17 refer to the same elements as shown in FIGS. 1 to 7. Numeral 20 refers to the pivot axis between the connecting rod 17 and the extreme end of the jib or boom, while numeral 21 refers to the second pivot point of the connecting rod, at which its opposite end is connected to the extreme end of the outermost telescoping member 14 of the rocker arm. Finally, curve R illustrates the path of movement of a point 22 adjacent to the extreme end of the crane jib or boom as, in operation of the crane, said point moves between the two end positions thereof, as shown. This point—at or adjacent to which, as a rule, a load hook or the corresponding implement is attached—will describe, as shown, a path which, for all practical purposes, may be considered to be a straight line. In other words, this means, obviously, that the first one of the two technical advances characterizing the invention, as mentioned in the preamble of this specification, will be achieved in the present case, as well, in spite of the simplified construction. On the other hand, it will be apparent from a comparison between the two embodiments, that the crane shown in FIG. 8 will require more space in height in its collapsed condition, than does the crane of FIGS. 1 to 7. This circumstance, as also appears from the drawing, is due to the fact that, in the embodiment shown in FIG. 8, in the first place, the jib or boom 4 has been given a greater length, and, in the second place, that, in this position, the telescoping member 14 of the rocker arm 10 extends rearwardly a greater distance than in the first embodiment.

According to a further feature of the invention, the connection between the axes 7 and 9 may be made an integral portion of the rocker arm 10, i.e. link 8 will merely have a geometrical counterpart.

Finally, it should be pointed out that the rocker arm, of course, could be provided with several telescoping members which may be pressure-fluid or manually adjustable, and that the expression "connecting rod" etc. should be considered to include any equivalents thereto, irrespective of any number of parts comprised therein and of the shape of such parts. It would be obvious also, that whenever there is a reference in the claims to a connection between a certain part and the "end" of another part, the term "end" has been chosen for the purpose of illustration, rather than limitation, and therefore should not be interpreted in a literal, but in a functional sense.

What is claimed is:

1. A loading apparatus for vehicles, particularly a hydraulically operated truck crane, which comprises in combination:
   (a) a jib having an inner end that is pivotally mounted adjacent the top end of a post so that the jib can swing through a vertical plane,
   (b) said jib being movable in a vertical direction by a first cylinder device having its inner end pivotally connected to said post and its outer end pivotally connected to a link,
   (c) said link being pivotally connected to said jib at a point that is remote from the post,
   (d) a rocker arm that comprises an inner section and an outer section that telescopes with respect to said inner section,
   (e) said link being rigidly connected to said inner section of said rocker arm,
   (f) said rocker arm being movable through a vertical plane by means of a second cylinder device,
   (g) said second cylinder device being pivotally connected to said jib at a point outwardly from the inner end of said jib,
   (h) a connecting rod that has an outer end that is pivotally connected to the outer section of the rocker arm and an inner end that is joined to the jib.

2. A loading apparatus according to claim 1 wherein the inner end of said connecting rod is pivotally connected *directly* with the jib.

3. A loading apparatus according to claim 1 wherein the inner end of said second cylinder device is pivotally connected to said jib at a point that is a substantial distance inwardly of the extreme outer end of the jib.

4. A loading apparatus according to claim 1 wherein a yoke is interposed between the connecting rod and the jib,
   (a) said yoke having one end thereof pivotally connected to the inner section of the rocker arm,
   (b) the opposite end of said yoke being pivotally connected to the connecting rod,
   (c) a pull rod having one end thereof connected to the jib adjacent the point where said second cylinder device is attached to said jib, and
   (d) the opposite end of said pull rod being pivotally attached to said yoke at a point intermediate the two ends of the yoke.

5. A loading apparatus according to claim 1 wherein the link is made integral with the rocker arm.

References Cited
UNITED STATES PATENTS

| 2,755,939 | 7/1956 | Rush | 212—35 |
| 3,279,621 | 10/1966 | Hackenberger | 212—35 |

ANDRES H. NIELSEN, *Primary Examiner.*